United States Patent [19]

Denzinger et al.

[11] Patent Number: 4,525,581

[45] Date of Patent: Jun. 25, 1985

[54] INCREASING THE EFFICIENCY OF HIGH MOLECULAR WEIGHT CROSSLINKED POLYCARBOXYLIC ACIDS

[75] Inventors: Walter Denzinger, Speyer; Heinrich Hartmann, Limburgerhof; Gerhard Faulhaber, Bad Durkheim; Hans-Jürgen Raubenheimer, Ketsch, all of Fed. Rep. of Germany

[73] Assignee: BASF Aktiengesellschaft, Ludwigshafen, Fed. Rep. of Germany

[21] Appl. No.: 572,244

[22] Filed: Jan. 20, 1984

[30] Foreign Application Priority Data

Jan. 26, 1983 [DE] Fed. Rep. of Germany ....... 3302496

[51] Int. Cl.³ .............................................. C08F 6/24
[52] U.S. Cl. ..................................... 528/503; 528/502
[58] Field of Search ................................. 528/502, 503

[56] References Cited

U.S. PATENT DOCUMENTS

| | | |
|---|---|---|
| 3,461,108 | 8/1969 | Heilman et al. |
| 3,706,703 | 12/1972 | Heilman ............................. 528/503 |
| 3,890,283 | 6/1975 | Casey et al. ......................... 528/503 |
| 4,012,461 | 3/1977 | Van Brederode . |
| 4,138,539 | 2/1979 | Landolt et al. ....................... 528/503 |
| 4,145,526 | 3/1979 | Vanlauten et al. ................. 528/503 |
| 4,293,668 | 10/1981 | Heimsch . |

FOREIGN PATENT DOCUMENTS 0031713 7/1981 European Pat. Off. .

*Primary Examiner*—Bernard Lipman
*Attorney, Agent, or Firm*—Oblon, Fisher, Spivak, McClelland & Maier

[57] ABSTRACT

40The efficiency of high molecular weight crosslinked polycarboxylic acids which are used as thickeners for neutral and alkaline aqueous systems and are obtained by precipitation polymerization or suspension polymerization of a mixture of (a) from 70 to 99.9% by weight of monoethylenically unsaturated carboxylic acids, (b) from 0.1 to 10% by weight of ethylenically diunsaturated or polyunsaturated monomers and (c) from 0 to 20% by weight of other monoethylenically unsaturated monomers at as high as 75° C. is increased by a process in which the copolymer is heated for from 2 minutes to 5 hours at from 80° to 130° C. after the polymerization.

7 Claims, No Drawings

INCREASING THE EFFICIENCY OF HIGH MOLECULAR WEIGHT CROSSLINKED POLYCARBOXYLIC ACIDS

Crosslinked polycarboxylic acids have a large variety of uses as water-swellable synthetic thickeners in the textile, pharmaceuticals, cosmetics, papermaking, adhesives, paint and mineral oil industries. These products are in general copolymers of acrylic acid or methacrylic acid, the copolymers being prepared by polymerization of a polymerizable ethylenically unsaturated carboxylic acid in the presence of monoethylenically polyunsaturated compounds as crosslinking agents.

A large number of crosslinking agents are known, for example methylenebisacrylamide (German Published Application No. DAS 1,103,585), butanediol diacrylate, divinylbenzene, divinyl sulfone, diallyl maleate (German Published Application No. DAS 1,138,225), polyallyl sucroses (U.S. Pat. No. 2,798,053), divinyldioxane (German Published Application No. DAS 2,017,451), allyl-containing acrylates (German Published Application No. DAS 2,214,945), triallyl cyanurate (German Published Application No. DAS 2,534,792), polyallyl ethers, trimethylacrylyltriazine (U.S. Pat. No. 2,985,625), tetravinyl- and tetraallylsilane and the corresponding tin and germanium compounds (U.S. Pat. No. 2,985,631), hexaallyl- and hexamethylallyltrimethylene sulfone (U.S. Pat. Nos. 2,985,625 and 2,958,679), triallylamine and tetraallylethylenediamine (U.S. Pat. No. 3,032,538), allyl esters of phosphoric acid and phosphorous acid (German Published Application No. DAS 1,595,727) and allylphosphoramido compounds (German Published Application No. DAS 2,822,423). All polycarboxylic acids which contain these crosslinking agents as copolymerized units give, in fully demineralized water, in concentrations of from 0.1 to 1% by weight, after neutralization, slightly viscous to rigid gels which, depending on the type of crosslinking agent used, are more or less stable to hydrolysis. However, a disadvantage of these crosslinked polycarboxylic acids is that they have a substantially reduced thickening effect in electrolyte-containing water, e.g. tap water, particularly where low concentrations of the thickener are used.

It is an object of the present invention to increase the efficiency of high molecular weight crosslinked polycarboxylic acids which are used as thickeners for neutral and alkaline aqueous systems.

We have found that this object is achieved by a process for increasing the efficiency of high molecular weight crosslinked polycarboxylic acids which are used as thickeners for neutral and alkaline aqueous systems and are obtained by precipitation polymerization or suspension polymerization of a mixture of
 (a) from 70 to 99.9% by weight of monoethylenically unsaturated carboxylic acids,
 (b) from 0.1 to 10% by weight of ethylenically diunsaturated or polyunsaturated monomers and
 (c) from 0 to 20% by weight of other monoethylenically unsaturated monomers
at as high as 75° C., wherein the copolymer is heated for from 2 minutes to 5 hours at from 80° to 130° C. after the polymerization.

Component (a) of the monomer mixture which is polymerized can be, in particular, any monoethylenically unsaturated carboxylic acid of 3 to 5 carbon atoms which can contain one or 2 carboxyl groups. Examples of suitable compounds are acrylic acid, methacrylic acid, crotonic acid, itaconic acid, mesaconic acid, maleic acid, fumaric acid and citraconic acid, as well as mixtures of these. To prepare particularly efficient thickeners, it is preferable to use acrylic acid or methacrylic acid in the polymerization. The monomer mixtures contain from 70 to 99.9, preferably from 76 to 99.7, % by weight of a monoethylenically unsaturated carboxylic acid.

Suitable components (b) of the monomer mixture are the conventional ethylenically diunsaturated and polyunsaturated monomers, e.g. divinylbenzene, divinyl ketone, buta-1,4-diene, ethylene glycol diacrylate, methylenebisacrylamide, diallyl phthalate, divinyl ether, divinyldioxane, polyalkenyl polyethers, e.g. polyallyl and polyvinyl ethers of oligosaccharides, such as pentaallyl sucrose and pentaerythritol triallyl ether, diallylacrylamide, polyallyl- and polyvinylsilanes, triallyl cyanurate, allyl esters of phosphoric acid and phosphorous acid and allylphosphoramido compounds, such as phosphoric acid monoethyl ester N,N-(diallyl)diamide, as well as mixtures of these monomers. Since, when they are used as thickeners, the crosslinked polycarboxylic acids are subjected to strongly hydrolyzing conditions, preferred crosslinking agents for the preparation of polymers which are stable to hydrolysis are those which show no tendency to undergo cleavage under strongly acidic or strongly basic conditions. These include, for example, divinylbenzene, divinyldioxane, tetravinylsilane, tetraallylsilane and pentaerythritol triallyl ether. The monomers of group (b) are used in the polymerization in an amount of from 0.1 to 10, preferably from 0.3 to 4, % by weight.

Suitable monomers (c) are any other monoethylenically unsaturated monomers which are copolymerizable with the monomers (a) and (b) and lead to copolymers which can be swelled in water. Examples of suitable compounds are amides and esters of ethylenically unsaturated mono- and dicarboxylic acids, e.g. acrylamide, methacrylamide, acrylates and methacrylates of monohydric alcohols of 1 to 8 carbon atoms, acrylonitrile, methacrylonitrile, monoesters and diesters of maleic acid, fumaric acid and itaconic acid with monohydric alcohols of 1 to 4 carbon atoms, vinyl acetate, vinyl propionate, vinyl alkyl ethers and acrylamidomethylpropanesulfonic acid. This group of monomers is used, if required, to modify the crosslinked polycarboxylic acids, and is present in an amount of from 0 to 20%, based on the copolymer.

These polymers are prepared by precipitation polymerization in an organic solvent in which the monomers are soluble and the copolymers are insoluble. The solvent must be inert to the monomers and the copolymers, and is preferably an aromatic or aliphatic hydrocarbon or a halohydrocarbon; however, any other solvent which satisfies the above requirements can also be used. Examples of suitable solvents are benzene, toluene, liquid paraffins, methylene chloride, dichloroethane, trichloroethane, butyl chloride, trifluoroethane, trichlorotrifluoroethane and tetrachlorodifluoroethane, preferred solvents being benzene and 1,1,1-trichloroethane.

In order to prevent agglomeration of the precipitated polymer particles, it is often advantageous to use protective colloids. Suitable protective colloids are polymers which are very hydrophilic and are readily soluble in the solvent used in the precipitation polymerization. Suitable examples are polyalkyl vinyl ethers, such as polymethyl vinyl ether, homopolymers and copolymers of vinylpyrrolidone with, for example, vinyl esters, e.g. vinyl acetate and/or vinyl propionate, or with acrylates or methacrylates; anhydrous homopolymers of vinylpyrrolidone are preferred. The protective colloid is added in an amount of from 0.1 to 10%, preferably from 0.3 to 3%, based on the monomers. The monomer concentration is in general from 5 to 20% by weight in the absence of a protective colloid, and from 20 to 40% by weight when a protective colloid is used. In order to obtain particularly high molecular weight crosslinked polycarboxylic acids, the polymerization of the monomer mixture of (a) and (b) with or without (c) is carried out at from 30° to 75° C., preferably from 40° to 70° C. A free-radical initiator which is soluble in organic solvents is required for the polymerization. Examples of suitable initiators are benzoyl peroxide, tert.-butyl ethylhexanoate, tert.-butyl peroctoate, tert.-butyl perpivalate, acetylcyclohexanesulfonyl peroxide, dicyclohexyl peroxydicarbonate, di-(tert.-butylcyclohexyl) peroxydicarbonate and azo compounds, e.g. 2,2'-azobisisobutyronitrile, 2,2'-azobis(2,4-dimethylvaleronitrile) and 2,2'-azobis(4-methoxy-2,4-dimethylvaleronitrile). Mixtures of such initiators are also frequently advantageous.

In order to improve the efficiency of high molecular weight crosslinked polycarboxylic acids as thickeners, the crosslinked copolymers are subjected to heat treatment. These copolymers, in the form of the suspension obtained in the polymerization, can be treated at from 80° to 130° C. If the polymerization has been carried out using a suspending agent whose boiling point is above 80° C., the polymer suspension is heated in an autoclave under superatmospheric pressure. During the heating, the suspension is preferably mixed. However, it may also be advantageous first to isolate the copolymer as a solid and then to heat this. In order to obtain a solid from the suspension, the latter is subjected to a mild drying process, for example in a spray drier, a fluidized-bed drier, or a paddle drier under reduced pressure. It is advisable to carry out this procedure in the absence of air or under nitrogen in order to avoid damaging the copolymer by oxidation. It is possible to heat the crosslinked copolymer not only in the form of a suspension or of a powder, but also in an inert solvent other than the suspending agent used in the preparation. This procedure is particularly advisable if the polymerization has been carried out in a chlorohydrocarbon or benzene, and it is intended to remove this solvent to a very substantial extent from the polymer. In these cases, the remaining solvent is extracted from the crosslinked polymer after the drying process, this extraction being carried out with the aid of, for example, an aliphatic hydrocarbon. The crosslinked copolymer is heated, in accordance with the invention, at from 80° to 130° C., preferably from 90° to 120° C. The treatment temperatures are always below the glass transition temperature of the polymer, so that the polymer does not agglomerate during heating. The duration of the heat treatment of the polymer is from 2 minutes to 5 hours, relatively long treatment times being suitable at 80° C. and very short ones at 130° C. If the crosslinked copolymer is heated for too long a time, its thickening action in aqueous systems is reduced, and can fall to virtually 0, because the polymer is then no longer swellable. The treatment conditions for the crosslinked copolymers have to be adapted to the properties of the products. For example, a particular product may achieve an optimum thickening action after a treatment time of 5 hours at 80° C. or 30 minutes at 100° C. or 3 minutes at 125° C. The time and temperature range for the heat treatment of the crosslinked copolymers have to be matched exactly in order to obtain a product having an optimum thickening action. In general, higher temperatures require shorter treatment times.

The copolymers treated in accordance with the invention give, after neutralization with a base, clear gels which are from free-flowing to rigid depending on the concentration. Thickening in water is achieved by neutralization of the carboxyl groups, optimum thickening being obtained in a pH range of from 6.0 to 10.0, preferably from 7.0 to 9.0. The base used for the neutralization is in general sodium hydroxide, potassium hydroxide, sodium carbonate, potassium carbonate, ammonia or a mixture of these. It is often advantageous to use, as the neutralizing agent, an amine, such as a tri-$C_1$–$C_5$-alkylamine or a mono-, di- or tri-$C_1$–$C_4$-alkanolamine, or a mixture of these with one another.

In the industrially used concentration of 0.3%, and after neutralization with ammonia, the products prepared according to the invention give gels whose viscosity in fully demineralized water becomes only slightly higher, but in electrolyte-containing water (synthetic tap water) is as much as about 50% higher than the viscosity of products which have not been heated after the polymerization.

The high molecular weight crosslinked copolymers prepared according to the invention can be used as, for example, thickeners in textile printing pastes, cosmetic and pharmaceutical formulations, disperse paints, adhesives and drilling muds.

To obtain reproducible values, the thickening action of the crosslinked copolymers was tested in a synthetic tap water having the following composition:

| | |
|---|---|
| 10.00 g of calcium chloride solution | brought to 1,000° |
| 5.00 g of magnesium sulfate solution | on the German |
| 0.12 g of sodium bicarbonate | hardness scale |
| 984.88 g of distilled water | |

The preparation of the thickener mixture and the measurement of the viscosity of the thickened aqueous system were carried out by the method below:

497 g of the synthetic tap water described above are initially taken in a 600 ml glass beaker, and, while stirring with a paddle stirrer at about 100 rpm, 1.5 g of a pulverulent crosslinked copolymer are then sprinkled in so that agglomeration of the powder in the water is avoided. The mixture is stirred for 10 minutes and then left to stand for 10 minutes, after which 1.5 g of 25% strength aqueous ammonia are added and the mixture is then homogenized. The pH of the mixture should be from 8 to 9. In order to obtain results which correspond to practice, a sample of 250 g of the mixture is stirred with a high-speed stirrer (propeller diameter 3.5 cm) at 8,000 rpm for 3 minutes. The temperature of this sample is then brought to 20° C. After the sample has been heated, the viscosity is measured in a Haake Viskotester VT 24 at 5.66 rpm.

PREPARATION OF CROSSLINKED POLYCARBOXYLIC ACIDS

In the Examples which follow, parts are by weight. The K values were determined in accordance with H. Fikentscher, Cellulose-Chemie 32 (1932), 58–64 and 71–74; $K = k \cdot 10^3$.

Thickener A 650 parts of benzene, 3 parts of anhydrous polyvinylpyrrolidone having a K value of 30, 3 parts of divinyldioxane and 300 parts of anhydrous acrylic acid were initially taken in a 2 liter glass reactor provided with an anchor stirrer and an inlet and an outlet for nitrogen, and the mixture was heated at 70° C. and with a stirrer speed of 200 rpm in a gentle stream of $N_2$. One part of a solution of 0.3 part of azodiisobutyronitrile in 50 parts of anhydrous benzene was then added. After ¼ hour, cloudiness was observed. The remainder of the azodiisobutyronitrile solution was then added in the course of 3 hours, after which the mixture was heated for a further hour at 70° C. After cooling, the polymer suspension was evaporated to dryness at 50° C. and under about 35 mbar in a rotary evaporator.

Thickener B 697 parts of 1,1,1-trichloroethane, 250 parts of anhydrous acrylic acid and 1.5 parts of pentaerythritol triallyl ether were initially taken in a 2 liter glass reactor provided with an anchor stirrer, a condenser and an inlet and outlet for nitrogen, and the mixture was heated at 65° C. and with a stirrer speed of 200 rpm in a gentle stream of $N_2$. 1 part of a solution of 0.25 part of acetylcyclohexanesulfonyl peroxide in 50 parts of 1,1,1-trichloroethane was then added. After ¼ hour, when the mixture had become cloudy, the remainder of the initiator solution was metered in uniformly in the course of 5 hours. The reaction mixture was then heated for a further hour at about 74° C., at which it boiled. During the polymerization, the mixture was diluted with 500 parts of 1,1,1-trichloroethane in order to keep it stirrable. After the polymer suspension had cooled, one part of it was dried in a paddle drier at 50° C. and under 40 mbar, while another part of the polymer suspension was heated in accordance with the invention (cf. Example 3).

EXAMPLE 1

Portions of 20 parts of thickener A are heated for various times at 80° C. in a gentle stream of nitrogen in a rotary evaporator, and the thickening effect is then determined. Example 1a is a comparative example in which no subsequent heat treatment has been carried out.

| Example 1 | Heating time [hours] | Viscosity of the thickener mixture [Pa · s] |
|---|---|---|
| a (Comparison) | — | 4.9 |
| b | 2 | 6.7 |
| c | 5 | 7.6 |

After 5 hours at 80° C., the viscosity has increased to 155% of the initial value.

EXAMPLE 2

20 parts of the thickener A are suspended in 80 parts of n-octane, and the suspension is heated for various times at 125° C., at which it boils. The solvent is evaporated at 50° C. and under 50 mbar in a rotary evaporator, after which the thickening action of the dry product is determined by the above method.

| Example 2 | Heating time [minutes] | Viscosity of the thickener mixture [Pa · s] |
|---|---|---|
| a (Comparison) | — | 4.8 |
| b | 2 | 5.3 |
| c | 6 | 7.7 |
| d | 20 | 5.6 |

The increase in viscosity after 6 minutes at 125° C. is 160%, based on the comparison (Example a).

EXAMPLE 3

After the polymerization, thickener B is heated at 100° C. under superatmospheric pressure. After various periods of time, samples are removed. These are dried in a drying oven under reduced pressure at 50° C., after which the thickening action of each of the powders is determined.

| Example 3 | Heating time [hours] | Viscosity of the thickener mixture [Pa · s] |
|---|---|---|
| a (Comparison) | 0 | 5.5 |
| b | 0.5 | 8.0 |
| c | 1 | 6.8 |
| d | 2 | 6.2 |

After 0.5 hour at 100° C., the viscosity increases to 145% of the initial value (experiment a).

EXAMPLE 4

20 parts of the pulverulent thickener B are suspended in 80 parts of n-octane, and the suspension is heated under various conditions, which are shown in the Table below. The suspensions are then dried in a drying oven under reduced pressure at 50° C., after which the thickening action of each of the powders is determined.

| Example 4 | Heating Temperature [°C.] | Time [hours] | Viscosity of the thickener mixture [Pa · s] |
|---|---|---|---|
| a (Comparison) | — | — | 4.9 |
| b (Comparison) | 20 | 24 | 4.8 |
| c | 80 | 0.5 | 6.7 |
| d | 80 | 1 | 7.0 |
| e | 80 | 2 | 7.2 |
| f | 80 | 4 | 7.5 |
| g | 100 | 0.25 | 7.0 |
| h | 100 | 0.5 | 7.8 |
| i | 100 | 1 | 7.6 |
| j | 100 | 2 | 7.0 |

In this series of experiments, the best thickening action was achieved after 4 hours at 80° C., and after 0.5 hour at 100° C.

We claim:

1. A process for increasing the efficiency of a high molecular weight cross-linked polycarboxylic acid copolymer which is used as a thickener for neutral and alkaline aqueous systems and is obtained by precipitation polymerization or suspension polymerization of the monomeric components of a mixture of (a) from 70 to 99.9% by weight of monoethylenically unsaturated carboxylic acids (b) from 0.1 to 10% by weight of ethylenically diunsaturated or polyunsaturated monomers as crosslinking agents and (c) from 0 to 20% by weight of other monoethylenically unsaturated monomers in an organic solvent in which the monomers are soluble and the copolymer is insoluble at a temperature no higher than 75° C., wherein the copolymer is heated in solid finely divided condition for from 2 minutes to 5 hours at from 80° to 130° C. but below the glass transition temperature of the copolymer, the time and temperature within such heating ranges being so selected as to obtain a copolymer whose gel when neutralized in electrolyte containing water is of higher viscosity than the unheated copolymer.

2. A process as claimed in claim 1, wherein the copolymer is heated while maintained in the form of a suspension in a solvent in which the copolymer is insoluble.

3. A process as claimed in claim 1, wherein the isolated dry pulverulent copolymer is heated.

4. A process as claimed in claim 1, wherein component (a) is acrylic acid or methacrylic acid.

5. A process according to claim 1 wherein the monomeric components are:

(a) a monoethylenically unsaturated carboxylic acid of 3 to 5 carbons and having one or two carboxy groups;
(b) at least one of the group consisting of divinylbenzene, divinyldioxane, tetravinylsilane, tetraallylsilane and pentaerythritol triallyl ether,
(c) at least one of the group consisting of acrylamide, methacrylamide, acrylates and methacrylates of monohydric alcohols of 1 to 8 carbon atoms, acrylonitrile, methacrylonitrile, monoesters and diesters of maleic acid, fumaric acid and itaconic acid with monohydric alcohols of 1 to 4 carbon atoms, vinyl acetate, vinyl propionate, vinyl alkyl ethers and acrylamidomethylpropanesulfonic acid, and the cross-linked copolymer is heated at from 90° C. to 120° C.

6. A process according to claim 5 wherein the heating is carried on until optimum viscosity increase is obtained.

7. A process according to claim 4 wherein the copolymer is obtained from only components (a) and (b) as monomeric components and wherein component (a) is acrylic acid and component (b) is divinyldioxane or pentaerythritol triallyl ether.

* * * * *